United States Patent Office 3,505,247
Patented Apr. 7, 1970

3,505,247
SELECTIVE STRATIFICATION SYSTEMS OF REGENERATING ANION EXCHANGE RESINS
Richard Hetherington, Glenside, and William Fries, Philadelphia, Pa., assignors to Rohm and Haas Company, Philadelphia, Pa., a corporation of Delaware
No Drawing. Filed Sept. 20, 1967, Ser. No. 669,255
Int. Cl. B01j 1/08
U.S. Cl. 260—2.1         3 Claims

ABSTRACT OF THE DISCLOSURE

Processes for regenerating exhausted mixtures of strong and weak base anion exchange resins. The weak base resin is preferentially regenerated prior to regeneration of the strong base resin, re-establishing a density differential which enables the two resins to be separated into two separate strata.

This invention relates to a method of improving the performance or functional capacity of anion exchange materials. More particularly, this invention is directed to an anion exchanging system employing a mixed bed of both strongly basic and weakly basic anion exchange resins. Still more particularly, this invention is concerned with a method of improving the efficiency of such systems in terms of their resins' ion exchange capacity and cost of regenerants for the resins.

BACKGROUND OF THE INVENTION

Field of the invention

Anion exchangers in the active basic form are commonly used to remove acids from water solutions. After exhaustion of the exchangers the adsorbed acids on the exchangers may be removed by means of basic solutions. The exchangers thereby are regenerated to the active basic form and corresponding salts of the adsorbed acids are formed with the regenerant base. These salts are washed out of the regenerated basic exchange material which is substantially insoluble. More details concerning conventional ion exchange practices, and methods for regenerating anion exchange resins, may be found in U.S. Patent 2,599,558 and 2,884,384 among many others.

Although ion exchange is most frequently practiced with columns or beds of a single resin, there has come into use for certain applications what has been called mixed beds. These generally consist of two or more types of resin, in a single column, normally comprising at least one anion exchange resin and one cation exchange resin. Of more recent origin has been the development of an ion exchange column containing at least two anion exchange resins of different basic strengths, e.g. one considered a strongly basic ion exchanger and one known as a weakly basic ion exchanger. An explanation of the differences of basicity of such exchangers, and the chemistry thereof, is set forth in some detail in U.S. Patent 2,917,368, and that explanation is incorporated herein by reference thereto. The column disclosed in that patent, incidentally, is not a mixed bed system as the weakly and strongly basic resins are kept separated by means of a fine screen. Examples of strongly basic resins available in commerce are those known to the trade as Amberlite IRA-402, Amberlite IRA-900, Dowex-1, and Dowex-2. Examples of weakly basic resins available in commerce are those known to the trade as Amberlite IR-45, Amberlite IRA-93, and Dowex-3.

Description of the prior art

The prior art has known that it is best to remove organic material by means of weakly basic resins, if it is at all possible to do so, since adsorbed organics can be more easily eluted from a weakly basic resin than from a strongly basic resin. Another reason for preferentially using weakly basic resins, moreover, is that they have a higher capacity for strong acids and a higher regeneration efficiency than do strongly basic anion exchange resins. Since organic impurities are not easily eluted from strongly basic resins they have the fault of being subject to fouling readily by such impurities in the solution being treated, whereas many of those same impurities do not significantly interfere with the ion exchanging functions of weakly basic resins.

It has also been well known in the art to utilize a unit of a weakly basic resin in the free base form, followed by a unit of a strongly basic resin in the hydroxide form, to achieve maximum ion exchanging efficiency (i.e. ion exchanging capacity per unit volume of resin) for acid removal with minimum cost for regenerant chemicals. However, such a system has had the disadvantage of requiring the use of two separate pieces of ion exchange equipment instead of one, and the concomitant high capital cost has been a serious impediment to the system's widespread adoption.

An obvious way in which this same desired result might be achieved is to utilize a mixture of weakly basic and strongly basic anion exchange resins, and this has been tried. Experience has shown, however, that for a given amount of regenerant chemicals such a system does not have as much capacity for removing a combination of strongly and weakly acidic materials as does an equivalent size two-unit system. Consequently, any cost-saving achieved by utilizing a single unit is offset by a much greater cost for regenerants which are required to obtain the same amount of ion exchanging capacity out of the comparable two-unit system.

Notwithstanding the existence of this body of knowledge concerning the use of combinations of strongly and weakly basic anion exchangers in sequential or mixed beds there has long been felt the need for increasing the ion exchange capacity of the resin pairs. In addition, there has also been felt the need for minimizing organic fouling of the strongly basic anion exchange resins which are operating on water containing organic materials. Until the invention disclosed in copending U.S. application Ser. No. 532,869 filed on Mar. 9, 1966 and now abandoned by Downing, Brock and Hetherington there had been known no way of attaining the desired increase in capacity, minimization of organic fouling of the strongly basic anion exchange resins, and improvement in efficiency beyond the limits characteristic of a given pair of resins. Their invention consisted of a technique whereby the strong and weak base resins, which are homogeneously mixed together when in the exhausted state, are stratified into separate layers with the strongly basic resin below and the weakly basic resin on top of the strong base resin. The present invention accomplishes the same result, but does so in an improved manner and is capable of functioning in situations which the Downing et al. invention cannot operate.

To understand the present invention, and to appreciate the improvement in the art it has made with reference to the Downing et al. process as well as the art which preceded that development, it will be helpful to first review the essence of the conventional practice which was in vogue before the Downing et al. regeneration method. The problem with which the prior art (as well as the present invention) has been concerned involves the use in a column of a substantially homogeneous mixture of a weakly basic anion exchanger in the free base form, and a strongly basic anion exchanger in the hydroxide form. A sample to be treated, such as water from which it is desired to remove weak acids such as $H_2CO_3$ and $H_2SiO_3$ and strong acids such as $H_2SO_4$, HCl and various organic acids, is passed downflow through the mixture. In the mixed resin condition of the bed the acids will indiscriminately come into contact with both the weakly basic and the strongly basic anion exchangers, causing the "unprotected" strongly basic resin to pick up strong acids, weak acids, and organic impurities so as to hasten exhaustion of the ion exchanging capacity thereof.

When leakage of silica past the resins occurs a backwashing procedure is employed, this procedure consisting in sending a liquid up-flow through the mixture of resins in the column, the liquid passing out of the column near its top while the resins fall back into place inside the column after the backwashing step is finished. This backwash serves to remove impurities loosely held in the bed as well as air bubbles entrapped therein. As a result of this backwash the two resins become intimately mixed due to the fact that when those resins are in the exhausted state their respective densities are practically the same. Caustic or other suitable basic regenerant then is added at the top of the column and sent down-flow through the resins so as to regenerate them and place them in condition for the next liquid-treating cycle.

After thus backwashing the exhausted resins the resins remain in a substantially homogeneously mixed state, both prior and subsequent to the regeneration step which follows. As such, they are subject to the disadvantage explained above, namely possession of a lower capacity in comparison with the equivalent amount of resins employed in a sequential two-column system.

Downing et al. discovered that if, after this regeneration step, another backwashing step is employed, the mixture of resins becomes stratified in seperate layers with the more dense strongly basic resins below and the less dense weakly basic resins above. They also discovered that the thus treated resins possessed a marked increase in ion exchange capacity for mixtures of weak and strong acids in comparison with the practice which was conventional before their discovery.

The Downing et al. process works very well, but it has been found to have inherent limitations which our present invention has overcome. For one thing, although the Downing et al. process is very effective with new resin beds it loses its effectiveness when applied to resin beds which have been in use for some time, particularly when the water being treated therewith is heavily loaded with organic ionic impurities which are adsorbed by the weakly basic resin. This loading of that resin increases its density to a point where there is no longer the essential difference in density between the weak and strong base resins which is critical to the operation of the Downing et al. process.

SUMMARY OF THE INVENTION

By contrast, our present invention operates very well with new or used beds of resin. It can be practiced in a number of alternative ways; some, which we call "non-curative" methods, are limited to use with beds that have already been stratified into separate resin layers; and others, which we call "curative" methods, are useful with either stratified beds or beds that are in a mixed resin condition. By "non-curative" we refer to methods which insure continued stratification of pre-stratified beds, but which are not capable of bringing about the separation of mixed resins into separate strata or layers. By "curative" we refer to methods which can work satisfactorily in cases where "non-curative" techniques will function, but will also operate in those cases where the resins are thoroughly and homogeneously mixed together, even where the difference in density between the strong and weak base resins is too small to make separation of the two a simple and efficient proceduce.

Another signfiicant distinction of the present invention over the Downing et al. process is that the latter involves the simultaneous regeneration of both the strong and weak base resins, whereas in our process one resin is thoroughly regenerated first, namely the weakly basic resin, and the strongly basic resin is regenerated later.

Certain other advantages of our system over the Downing et al. and other prior art systems are inherent and more or less obvious. In our system less of the strongly basic ion exchange resin bed is exposed to the foulant since there is a more effective preferential absorption of organic impurities on the weakly basic resin as a result of the improved stratification of the resins which our invention makes possible. Only simple bleed connections need be made to the valving in existing ion exchange processing equipment, no basic alterations in the design or construction of the equipment being necessary. Some steps are eliminated, such as certain backwashes and extensive mixing of resins which characterized prior art methods, and in these and other ways the regeneration process is made simpler than ever before.

Our present invention consists essentially in a method whereby, after the normal exhaustion phase in which both the weakly and strongly basic resins have been made to exchange their OH⁻ ions for anions in the water being treated, the strong base resin is permitted to remain essentially in its exhausted form while the weak base resin is regenerated with a base. This preferential regeneration of the weak base resin will cause the greatest density difference between the two resins that is possible to obtain, thereby aiding in the desired resin stratification. Our novel method for accomplishing this preferential regeneration and subsequent stratification is illustratively represented in the following four procedures (A to D, inclusive).

*Procedure A.*—In this procedure a stoichiometric amount of ammonia is used as the regenerant. Regeneration is done either up- or downflow in the ion exchange column, at either high or low flow rates. (High flow rates are generally considered to be approximately 2 gallons, or more, per cubic foot/min. Low flow rates are generally considered to be approximately ½ gal./cu. ft./min., or less. The "normal" flow rate is equivalent to the "low" flow rate.) Ammonia, being a very poor regenerant for the strong base resin, but a very good regenerant for the weak base resin, serves to convert the latter to the free base form in which it has its lowest density, and leaves the strongly basic resin in the exhausted salt form in which it has its greatest density. The result is to establish the maximum difference in density between the two resins and therefore to make possible the greatest degree of separation or stratification of the two materials.

If carried out by introducing the regenerant in the backwash step, the resins would be stratified during this step. If introduced downflow, a separate water backwash would be necessary to unsettle the bed and give the now lighter weak base resin a chance to become separated from the heavier strong base resin, with the latter falling to the bottom of the column and the former resting above the strong base resin layer. In essence, the preferential sequence of operations would be: (1) water backwash, (2) ammonia, (3) water rinse, (4) water backwash, (5) regeneration of strongly basic resin by passing concentrated caustic down through the column, (6) water rinse, and (7) place in service.

*Procedure B.*—In this procedure a stoichiometric amount of a dilute base (i.e. a concentration of 2% or less) of any base is used as the regenerant for the weak base resin. Regeneration is done either up- or downflow in the ion exchange column, as either high or low flow rates. Like Procedure A, this will also result in the ready regeneration of the weak base resin and the very much less effective regeneration of the strongly basic resin. In essence, the preferential sequence of operation would be:

(1) water backwash, (2) regeneration of weakly basic resin with a dilute base solution, (3) rinse to displace regenerant, (4) water backwash, (5) regeneration of strongly basic resin with concentrated caustic, (6) water rinse, and (7) service cycle.

*Procedure C.*—In this procedure a stoichiometric amount of a normal concentration (over 2% and not more than 5%, preferably 4%) of any base is used as the regenerant for the weak base resin. Regeneration is done only downflow, at a low (or normal) flow rate. The preferential sequence is the same as set forth in Procedure B, with the only exclusion being step (1), the initial backwash step.

*Procedure D.*—In this procedure a stoichiometric amount of a normal concentration of base is used, either up- or downflow, at a high flow rate. This will preferentially regenerate the weakly basic resin. The preferential sequence is (1) water backwash, (2) regeneration of weakly basic resin, (3) water rinse, (4) water backwash, (5) regeneration of strongly basic resin, (6) water rinse, and (7) service.

It should be understood that the concept of using the various resin bed stratification systems, as herein disclosed, may be used for ion exchange applications other than water treatment. Examples are uranium processing, sugar purification, pharmaceutical treatment, etc., in which applications are employed forms other than the basic forms (e.g. salt forms).

Following are some actual examples of applications of the foregoing general procedures:

EXAMPLE 1

An ion exchange column was employed which had been in operation for about six months in a two bed deionization system for treating a poor quality surface water. It consisted of a Stratabed, i.e. separate layers, of 75% Amberlite IRA-402 (a strongly basic, quaternary ammonium, styrene-divnylbenzene type anion exchange resin) in the hydroxide form, and 25% Amberlite IRA-93 (a weakly basic tertiary amine, styrene-divinyl-benzene type anion exchange resin) in the free amine form. In these forms the density difference between the resins, when new, is great enough to allow separation and stratification of the beds when backwashed. These resins had reached the point where, as a result of extensive organic fouling of the weak basic resin, there was essentially no difference in the densities of both resins, and separation of the resins became almost impossible.

The resin beds were first mixed thoroughly in order to make the test more severe. They then were backwashed in two separate experiments, in one instance with a 10% (by weight), and in the other instances with a 4% (by weight) of commercially available (28-30% ammonia solutions. The approximate normality of the solutions were 0.8 N and 0.3 N, respectively. The amount of ammonia used in both experiments corresponded to 110% of the equivalents of Amberlite IRA-93 in the column. The flow rate was 0.5 gal./ft.$^3$/min. After the ammonia backwash deionized water was used to continue the backwash until separation of the resin was achieved. The stratification of Amberlite IRA-93 on the top layer in each experiment was found to be approximately 95% complete.

EXAMPLE 2

An ion exchange column was used similar to the one described in Example 1, except that it consisted of resins which had been exhausted but which were still in their stratified state, no mixing having taken place. Through this bed was passed an amount of 4% caustic, equal to 120% of the total exchange capacity of the Amberlite IRA-93 resin, at a flow rate of 0.25-0.50 gal./ft.$^3$/min. This preferentially regenerated the Amberlite IRA-93 stratified as the upper of the two layers in the column. No rinse was found to be necessary. The bed was then backwashed with strong caustic to regenerate the Amberlite IRA-400, without any mixing of the resins taking place.

EXAMPLE 3

An ion exchange column was used exactly like the one described in Example 1, one which also had been used to treat the same type of water over and over in a six-montth period, and those resins had become "hopelessly" mixed together (meaning that they could no longer be separated and regenerated into separate strata as was possible when the resins had a definite difference in their respective densities). Through this entire bed was quickly passed a 4% NaOH solution, the flow rate being 2 gal./ft.$^3$/min. The volume of caustic was equal to ½ the bed volume of resin (although as much as 120% of the entire Amberlite IRA-93 capacity in the column could be used). The bed then was backwashed to effect stratification.

EXAMPLE 4

Example 3 was repeated except that the regeneration was accomplished with a 1% caustic solution, the volume being equivalent to 120% of the Amberlite IRA-93 equivalents present in the column.

As a final instructive note to those who would practice our invention, it is pointed out that the conventional backwashing step after exhaustion of the resin mixture should preferably be eliminated. Such backwashing would only serve to mix the beds, in which case only the curative separation techniques of this invention can be employed successfully on every cycle. If the backwashing step is eliminated, however, then the non-curvative techniques will work quite satisfactorily.

We claim:

1. The process of improving the ion exchange capacity of that portion of the anion exchange resins in a single column which comprises an essentially homogeneous mixture of partially or substantially completely exhausted weak base and strong base anion exchange resins, and to minimize fouling of the strongly basic anion exchange resins by organic materials in water being treated by the resins, which process consists in preferentially regenerating the weak base resin without altering the exhausted form of the strong base resin so as to establish the maximum possible difference in density between the two resins, the preferential regeneration being accomplished by using either ammonia or a dilute caustic solution as the regenerant so as to regenerate the weak base resin, backwashing the resin with either of these regenerants or water to unsettle the bed of resins and enable the now lighter weak base resin to separate from and float upwards away from the now heavier strong base resin which remains below, and then using concentrated caustic to regenerate the strongly basic resin.

2. The process of claim 1 in which a stoichiometric amount of dilute caustic solution is employed to regenerate the weak base resin.

3. The process of claim 1 in which ammonia is employed to regenerate the weak base resin.

References Cited

UNITED STATES PATENTS

| | | | |
|---|---|---|---|
| 2,666,741 | 1/1954 | McMullen | 210—247 |
| 2,917,368 | 12/1959 | Juda | 23—185 |
| 3,197,401 | 7/1965 | Arai | 210—30 |

WILLIAM H. SHORT, Primary Examiner

M. GOLDSTEIN, Assistant Examiner

U.S. Cl. X.R.

210—31